Patented Sept. 19, 1922.

1,429,350

UNITED STATES PATENT OFFICE.

PETER J. IHRIG, OF SPRINGFIELD, OHIO, ASSIGNOR OF ONE-HALF TO JUSTUS K. IHRIG, OF SPRINGFIELD, OHIO.

CURB BOX OR PIPE.

Application filed May 16, 1921. Serial No. 470,150.

*To all whom it may concern:*

Be it known that I, PETER J. IHRIG, a citizen of the United States, residing at Springfield, in the county of Clark and State of Ohio, have invented certain new and useful Improvements in Curb Boxes or Pipes, of which the following is a specification, reference being had therein to the accompanying drawing.

This invention relates to improvements in curb boxes or pipes used in connection with water and gas mains. These boxes or pipes are buried in the ground and extend from such main, or more particularly from the branch line from the main to the house, up to the ground surface and afford, when their cap is removed, a ready means of inserting a long handled wrench used to turn the plug of the water or gas valve.

In practice, it has been found that the fastenings by which the cap is secured to the box or pipe often rust and when forced in the act of unfastening them they break off. As for instance, in the case of a bolt it will shear off of the nut which is down inside of the box or pipe under the cap.

It has also been found that the projection within the box or pipe with which the fastening bolt engages often breaks off, usually being of cast iron and more or less brittle. A breaking of the projection renders useless the entire box or pipe and usually the cap. This requires the purchase and installation of an entirely new box or pipe with its cap and fastening devices.

It is the object of my invention to do away with the expense thus incident to breakage in the fastening device and to this end my invention consists, essentially, of a fastening comprising a bolt and nut on the one part and a series of nut-holders, so that if the bolt shears off of the nut, the bolt and nut can readily be removed and another bolt and its nut may readily be used in connection with the same holder; and so that also if a nut holder breaks there are others with which the original or a new bolt and nut may be used.

In the accompanying drawings,

Fig. 1 is a plan view of a water or gas box or pipe in which my invention is embodied;

Fig. 2 is a vertical, sectional view showing the locking bolt and nut in elevation, taken on the line 2—2 of Fig. 4;

Fig. 3 is another vertical, sectional view taken on the line 3—3 of Fig. 4; and

Fig. 4 is a horizontal, sectional view taken on the line 4—4 of Fig. 2;

The numeral 1 designates a cast iron water or gas box or pipe of any approved or conventional kind and adapted to extend from the ground surface down to the cut-off in the supply pipe which runs from the main to the building or place of use.

This box is provided with a cover 2. This box or pipe and cover are of the usual type, save as modified by the presence of my invention.

Within the box or pipe I form a series of nut-holders composed of walls or ribs 3 having lugs 4 in succession one above another so as to leave a pocket or space 5 between the opposite walls 3 and any four of the lugs. This whole structure I term a nut-holder because the nut 6 of the fastening bolt 7 may be placed within any one of these pockets in such a way that the sides of the nut engage with the walls 3 and the upper surface of the nut engages with the adjacent pair of lugs 4. In this way the nut is held from turning when the bolt is screwed into it and unscrewed from it.

And in this way also, when the bolt is screwed down hard, as by the application of a wrench to its head 8 which occupies a position in the recess 9 in the cover 2, the nut will be drawn tightly against the lugs 4 above it. Thus the cap is held firmly and strongly and yet is easily removed.

But it often happens that, due to the dampness of the location, the bolt and nut badly rust. When the bolt is to be unscrewed and is forced it not infrequently shears off of the nut. Nor is it infrequent that the projection with which the nut of the bolt engages, in the common styles heretofore in use, will shear off or somehow become broken. This renders useless the whole equipment.

But in the case of my invention, should the bolt shear off of the nut or should a holder break, a new bolt and nut can be used with the same holder, if the holder is not broken, or with a new holder in case the holder also is broken, and so on through the series.

And in my invention also, if the lugs 4 above any one pocket should break, and being of cast iron they are exposed to snapping off, another set is available for immediate use. Thus, under these circumstances the shearing of bolts from their nuts and the breakage of the projections or lugs which hold the nuts do not require the purchase and installation of an entirely new box or pipe, nor occasion the delay incident to procuring a new equipment. As the usual cost of a box or pipe with this cap and fastening is about $15.00 retail, while the cost of a nut and bolt, in case the nut is sheared off, is only about 5¢, the utility and advantages of my invention will be convincingly apparent.

Having thus fully described my invention, what I claim as new and desire to secure by Letters Patent, is:—

1. In a device of the character described, the combination, with a box or pipe having a series of nut-holders, of a cap and a bolt extended through the cap and having a nut adapted to engage any one of the nut holders.

2. In a device of the character described, the combination, with a box or pipe having walls and a series of lugs constituting nut-holders, of a cap and a bolt extended therethrough and having a nut adapted to occupy any of the nut-holders.

3. In a device of the character described, the combination, with a box or pipe having two vertical walls with a series of lugs projecting therefrom, thus forming pockets constituting nut-holders, of a cap and a bolt extended therethrough and between said lugs and having a nut adapted to occupy any of the nut-holders to engage the adjacent upper lugs.

4. In a device of the character described, a box or pipe having two supplemental vertical walls spaced apart and lugs projecting therefrom.

5. In a device of the character described, the combination, with a box or pipe having two vertical walls spaced apart, and a succession of lugs projecting therefrom and forming a series of pockets constituting nut-holders.

In testimony whereof, I affix my signature.

PETER J. IHRIG.